(12) United States Patent
Tashima et al.

(10) Patent No.: US 8,310,805 B2
(45) Date of Patent: Nov. 13, 2012

(54) MULTILAYER CERAMIC ELECTRONIC COMPONENT INCLUDING PLATING MATERIAL OF EXTERNAL TERMINAL ELECTRODE DISPOSED IN VOIDS OF INNER CONDUCTOR AND METHOD FOR MANUFACTURING THE SAME

(75) Inventors: Takeshi Tashima, Sabae (JP); Hiroyuki Matsumoto, Izumo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 571 days.

(21) Appl. No.: 12/481,694

(22) Filed: Jun. 10, 2009

(65) Prior Publication Data

US 2009/0310276 A1 Dec. 17, 2009

(30) Foreign Application Priority Data

Jun. 11, 2008 (JP) ................................ 2008-152655
Apr. 15, 2009 (JP) ................................ 2009-099133

(51) Int. Cl.
*H01G 4/005* (2006.01)
*H01G 4/06* (2006.01)

(52) U.S. Cl. ..................................... 361/303; 361/321.2
(58) Field of Classification Search ............... 361/321.2, 361/303
See application file for complete search history.

(56) References Cited

U.S. PATENT DOCUMENTS

| | | | |
|---|---|---|---|
| 5,316,698 A * | 5/1994 | Tani et al. ...................... 252/512 |
| 6,621,682 B1 * | 9/2003 | Takakuwa et al. ......... 361/306.3 |
| 6,855,222 B2 * | 2/2005 | Konoue et al. .............. 156/89.16 |
| 6,960,366 B2 | 11/2005 | Ritter et al. |
| 6,972,942 B2 | 12/2005 | Ritter et al. |
| 6,982,863 B2 | 1/2006 | Galvagni et al. |
| 7,067,172 B2 | 6/2006 | Ritter et al. |
| 7,152,291 B2 | 12/2006 | Ritter et al. |
| 7,154,374 B2 | 12/2006 | Ritter et al. |
| 7,161,794 B2 | 1/2007 | Galvagni et al. |
| 7,177,137 B2 | 2/2007 | Ritter et al. |
| 7,344,981 B2 | 3/2008 | Ritter et al. |
| 7,345,868 B2 | 3/2008 | Trinh |
| 7,463,474 B2 | 12/2008 | Ritter et al. |
| 7,719,819 B2 * | 5/2010 | Motoki et al. ............. 361/321.2 |
| 2005/0046536 A1 | 3/2005 | Ritter et al. |
| 2007/0014075 A1 | 1/2007 | Ritter et al. |
| 2008/0123248 A1 | 5/2008 | Kunishi et al. |
| 2008/0123249 A1 | 5/2008 | Kunishi et al. |
| 2008/0158774 A1 | 7/2008 | Trinh |

FOREIGN PATENT DOCUMENTS

| | | | |
|---|---|---|---|
| JP | 63169014 A | * | 7/1988 |
| JP | 08115483 A | * | 5/1996 |
| JP | 2000049039 A | * | 2/2000 |
| JP | 2002208533 A | * | 7/2002 |
| JP | 2005327999 A | * | 11/2005 |
| JP | 2006210590 A | * | 8/2006 |
| WO | 2007/049456 A1 | | 5/2007 |
| WO | WO 2007119281 A1 | * | 10/2007 |

* cited by examiner

*Primary Examiner* — David M Sinclair
(74) *Attorney, Agent, or Firm* — Keating & Bennett, LLP

(57) ABSTRACT

A multilayer ceramic electronic component includes external terminal electrodes that are formed by direct plating on the first and second side surfaces of a ceramic body including stacked ceramic layers and inner conductors. The external terminal electrodes include base plating films formed so as to cover the exposed portions of inner conductors. Voids are provided that are open to the side surfaces of the ceramic body so as to be adjacent to the ends in the width direction of the exposed portions of the inner conductors. A plating metal defining the base plating films enters the voids and is electrically connected to the inner conductors in the ceramic body.

3 Claims, 10 Drawing Sheets

MULTILAYER CERAMIC ELECTRONIC COMPONENT INCLUDING PLATING MATERIAL OF EXTERNAL TERMINAL ELECTRODE DISPOSED IN VOIDS OF INNER CONDUCTOR AND METHOD FOR MANUFACTURING THE SAME

BACKGROUND OF THE INVENTION

1. Field of the Invention

The present invention relates to a multilayer ceramic electronic component and a method for manufacturing the multilayer ceramic electronic component. Particularly, the present invention relates to a multilayer ceramic electronic component in which an external terminal electrode connected to an inner conductor is formed on the surface of a ceramic body by direct plating and a method for manufacturing the multilayer ceramic electronic component.

2. Description of the Related Art

In recent years, the market for small portable electronic devices such as cellular phones, notebook computers, digital cameras, and digital audio devices has expanded. Portable electronic devices with not only smaller sizes but also higher performance have been rapidly developed. Such portable electronic devices include many multilayer ceramic electronic components. For such multilayer ceramic electronic components, smaller sizes and higher performance are also required. For example, multilayer ceramic capacitors with smaller sizes and larger capacitances are required.

To achieve multilayer ceramic capacitors with smaller sizes and larger capacitances, it is effective to make ceramic layers thin. Capacitors whose ceramic layers have a thickness of about 3 μm or less have been used recently. At present, much thinner layers are required. However, a short circuit between internal electrodes is more likely to occur as the thickness of ceramic layers decreases. This causes problems with quality assurance.

To achieve multilayer ceramic capacitors with smaller sizes and larger capacitances in a different manner, it is effective to increase the effective area of the inner electrodes. When multilayer ceramic capacitors are mass-produced, the side margins between an inner electrode and the side surface of a ceramic body and the end margins between an inner electrode and the end surface of a ceramic body must be ensured to some extent, due to displacement that may occur during stacking or cutting ceramic green sheets. Therefore, when the effective area of the inner electrodes is increased, the area of the ceramic layers must be increased to ensure a margin. However, increasing the area of ceramic layers within the predetermined size standards of products has its limit, and the thickness of external terminal electrodes prevents the area of ceramic layers from being widened.

The external terminal electrode of multilayer ceramic capacitors has been formed by applying a conductive paste to the end of a ceramic body and baking the conductive paste. The primary method for applying a conductive paste is to immerse the end of a ceramic body in a paste tank and then pull the ceramic body out of the paste tank. However, a thick conductive paste easily adheres to the central portion of the end of the ceramic body with this method due to viscosity of the conductive paste. Thus, a portion of the external terminal electrode is thick (specifically more than about 30 μm), and the area of ceramic layers must to be decreased by the thickness of the external terminal electrode.

Accordingly, a method for forming an external terminal electrode by direct plating has been proposed. In this method, a plating film is deposited at the exposed portions of the inner electrodes on the end surface of a ceramic body, and the plating film grows. As a result, the exposed portions of the inner electrodes that are adjacent to each other are connected. According to this method, a thin flat electrode film can be formed as compared to the existing method that uses a conductive paste (See WO 2007/049456).

Although the high bonding strength of an external terminal electrode to a ceramic body due to an adhesive effect of glass is achieved in the existing method for applying a conductive paste and baking it, such high bonding strength cannot be achieved in the method for forming an external terminal electrode by direct plating. Therefore, the bonding strength of an external terminal electrode defined by a plating film to a ceramic body tends to be insufficient, which causes a problem of low reliability.

SUMMARY OF THE INVENTION

To overcome the problems described above, preferred embodiments of the present invention provide a high-performance small multilayer ceramic electronic component having a thin external terminal electrode with high bonding strength to a ceramic body and a method for efficiently manufacturing the multilayer ceramic electronic component.

A multilayer ceramic electronic component according to a preferred embodiment of the present invention includes a ceramic body having a first principal surface and a second principal surface opposing each other and a plurality of side surfaces connecting the first principal surface to the second principal surface, the ceramic body including a plurality of stacked ceramic layers, an inner conductor disposed in the ceramic body, the inner conductor including an exposed portion having a width on at least one of the side surfaces, and an external terminal electrode provided on at least one of the side surfaces, the external terminal electrode being electrically connected to the inner conductor.

The external terminal electrode includes a base plating film provided on at least one of the side surfaces by direct plating so as to cover the exposed portion of the inner conductor. Voids are provided in a discontinuous manner at peripheries at which the inner conductor contacts the ceramic layers, some of the voids are open to the side surfaces of the ceramic body, and a plating metal defining the base plating film enters the voids that are open to the side surfaces of the ceramic body, and is electrically connected to the inner conductor in the ceramic body.

A method for manufacturing a multilayer ceramic electronic component according to a preferred embodiment of the present invention including a ceramic body formed by stacking a plurality of ceramic layers, a plurality of inner conductors that are formed in the ceramic body, portions of the inner conductors being exposed on a side surface of the ceramic body, which are exposed portions, and an external terminal electrode formed on the side surface of the ceramic body so as to be electrically connected to the inner conductors and so as to cover the exposed portions of the inner conductors, includes the steps of forming the ceramic body having the plurality of inner conductors arranged so as to face each other through the ceramic layers and having voids formed in a discontinuous manner at peripheries at which the inner conductors contact the ceramic layers, some of the voids being open to the side surface of the ceramic body, and forming a base plating film on the side surface of the ceramic body by direct plating in a step of forming the external terminal electrode on the ceramic body, such that the base plating film covers the exposed portions of the inner conductors and a plating metal defining the base plating film enters the voids that are open to the side surface of the ceramic body and is electrically connected to the inner conductors in the ceramic body.

In the step of forming the ceramic body, the voids may preferably be formed when a green ceramic body is fired.

The multilayer ceramic electronic component according to a preferred embodiment of the present invention has a structure in which the external terminal electrode includes a base plating film provided on at least one of the side surfaces by direct plating so as to cover the exposed portion of the inner conductor and in which a plating metal defining the base plating film enters the voids that are open to the side surfaces of the ceramic body so as to be adjacent to one end in the width direction of the exposed portion of the inner conductor, and is electrically connected to the inner conductor in the ceramic body. Therefore, a high-performance small multilayer ceramic electronic component having a thin external terminal electrode with high bonding strength to a ceramic body can be provided.

Furthermore, since the voids are preferably arranged in a discontinuous manner, the plating metal does not enter the electronic component to a greater extent than necessary. Although the plating metal is deposited as a plating solution enters, the plating solution does not enter the electronic component to a greater extent than necessary. As a result, the reliability of the multilayer ceramic electronic component is improved.

The method for manufacturing a multilayer ceramic electronic component according to a preferred embodiment of the present invention includes the steps of forming the ceramic body that has the plurality of inner conductors arranged so as to face each other through the ceramic layers, portions of the inner conductors being exposed on a desired side surface of the ceramic body, and that has a structure in which the voids are open to the side surface of the ceramic body so as to be adjacent to at least one end in the width direction of the exposed portions of the inner conductors, and forming the base plating film on the side surface of the ceramic body by direct plating in a step of forming the external terminal electrode on the ceramic body, such that the base plating film covers the exposed portions of the inner conductors and enters the voids that are open to the side surface of the ceramic body so as to be electrically connected to the inner conductors in the ceramic body. Therefore, a high-performance small multilayer ceramic electronic component having a thin external terminal electrode with high bonding strength to a ceramic body, the electrode being formed from a plating film, can be efficiently manufactured.

When the voids are formed when a green ceramic body is fired in the step of forming the ceramic body, the voids can be formed without performing an extra step. This is particularly advantageous to simplify the method and to reduce the cost thereof.

Other features, elements, steps, characteristics and advantages of the present invention will become more apparent from the following detailed description of preferred embodiments of the present invention with reference to the attached drawings.

DETAILED DESCRIPTION OF PREFERRED EMBODIMENTS

Preferred embodiments of the present invention will be described in detail with reference to the accompanying drawings.

First Preferred Embodiment

Figure 1:
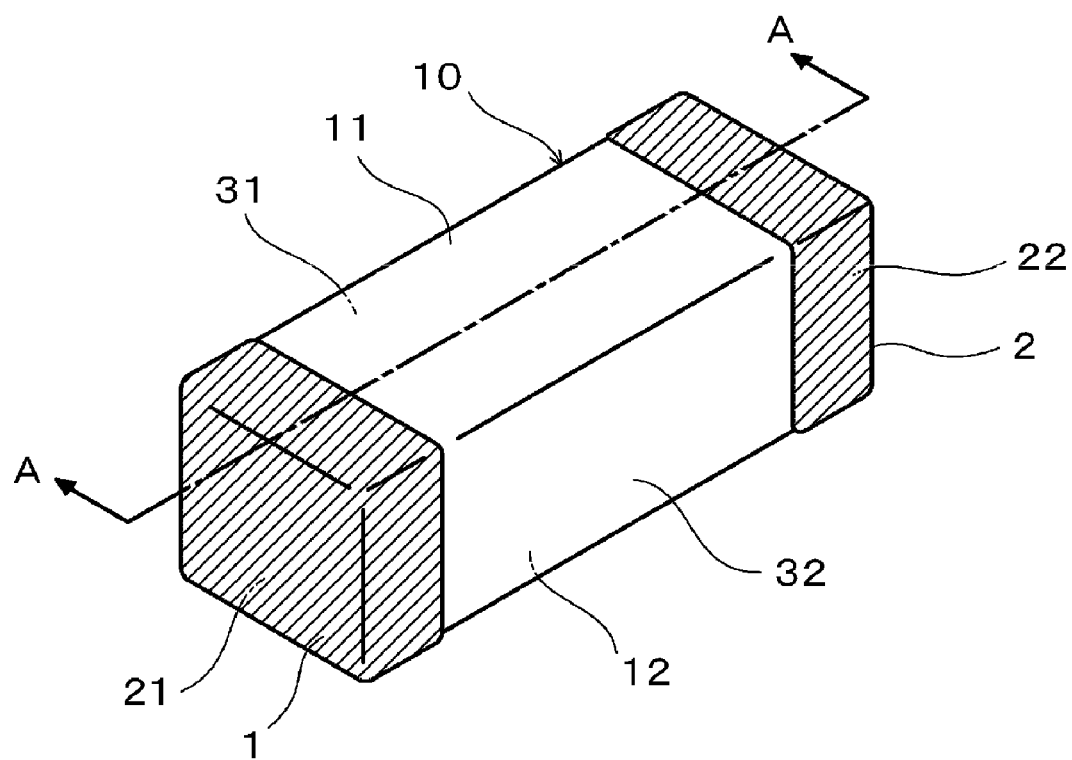
FIG. 1 is a perspective view showing an exterior of a multilayer ceramic electronic component according to a first preferred embodiment of the present invention.
Figure 2:
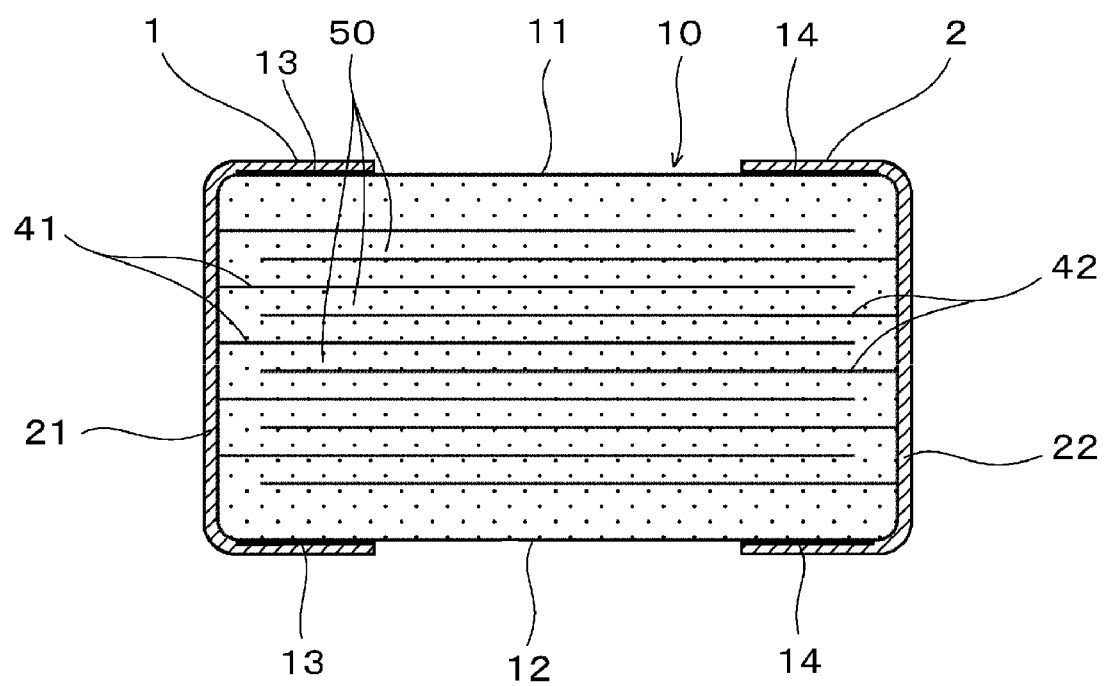
FIG. 2 is a sectional view taken along line A-A of FIG. 1.
Figure 3:
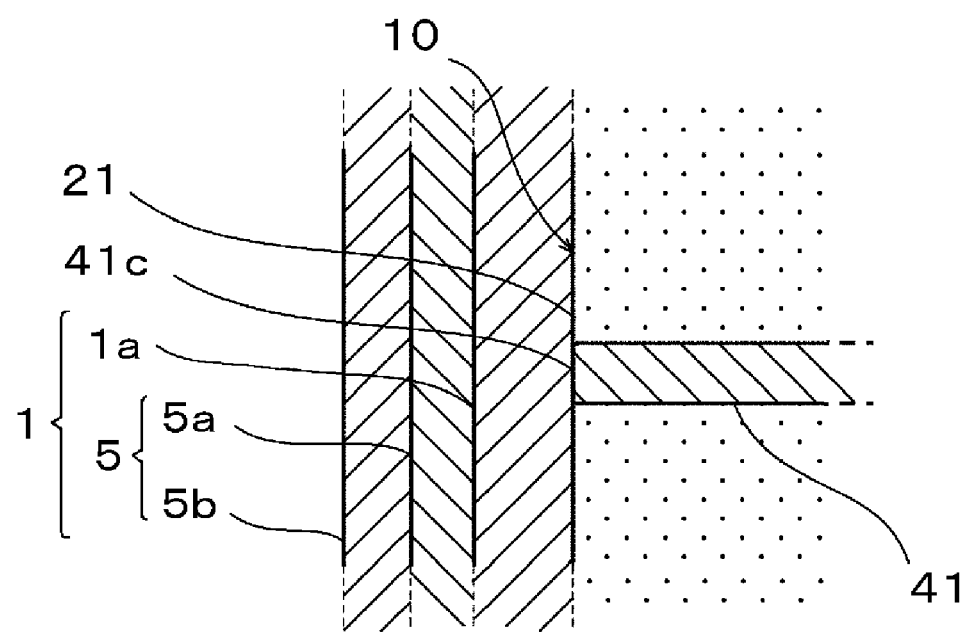
FIG. 3 is an enlarged view of a main portion of the multilayer ceramic electronic component according to the first preferred embodiment of the present invention.
Figure 4:
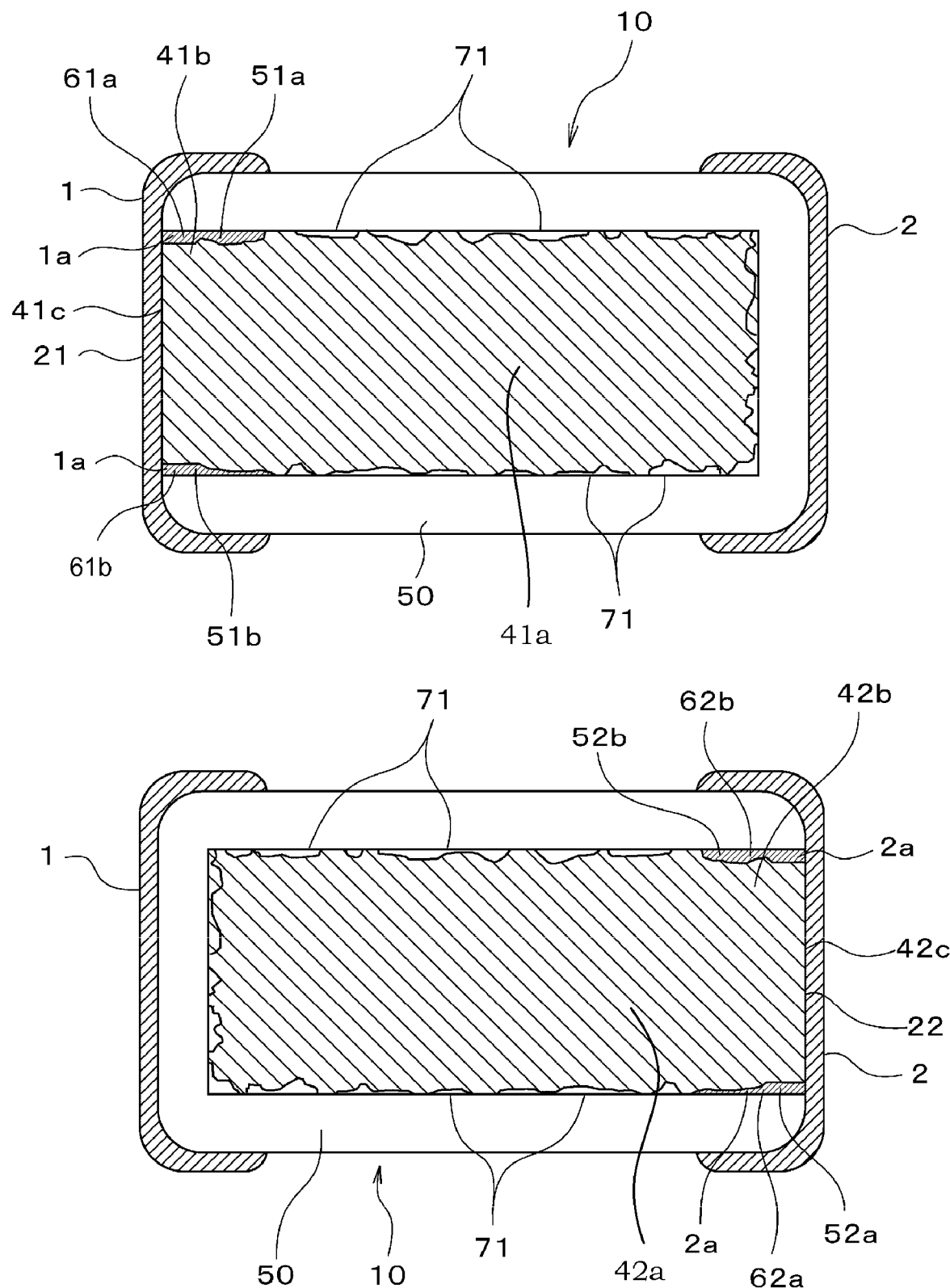
FIG. 4 is a schematic exploded plan view of FIG. 1, showing an inner electrode pattern of the multilayer ceramic electronic component according to the first preferred embodiment of the present invention.

FIG. 1 is a perspective view showing a multilayer ceramic electronic component according to a first preferred embodiment of the present invention. FIG. 2 is a sectional view taken along line A-A of FIG. 1. FIG. 3 is a fragmentary enlarged view of FIG. 2 showing a film structure of a first external terminal electrode. FIG. 4 is a schematic exploded plan view of FIG. 1.

As shown in FIGS. 1 and 2, the multilayer ceramic electronic component includes a substantially rectangular parallelepiped ceramic body 10 having a first principal surface 11 and a second principal surface 12 opposing each other, and a first side surface 21, a second side surface 22, a third side surface 31, and a fourth side surface 32 connecting the first principal surface 11 to the second principal surface 12. The ceramic body 10 includes a plurality of stacked ceramic layers 50.

The first side surface 21 and the second side surface 22 oppose each other, and the third side surface 31 and the fourth side surface 32 also oppose each other.

A first external terminal electrode 1 and a second external terminal electrode 2 are provided on the first side surface 21 and the second side surface 22, respectively. The first external terminal electrode 1 and the second external terminal electrode 2 are electrically insulated.

A first surface conductor 13 and a second surface conductor 14 are provided on the first principal surface 11 and the second principal surface 12. The first surface conductor 13 supports the portions of the first external terminal electrode 1 that extend onto the first and second principal surfaces 11 and 12. The second surface conductor 14 supports the portion of the second external terminal electrode 2 that extends onto the first and second principal surfaces 11 and 12. The first and second surface conductors 13 and 14 may be provided on the first and second side surfaces 21 and 22, respectively. Where the portions of the first and second external terminal electrodes 1 and 2 that extend onto the first and second principal surfaces 11 and 12 are not very long, the first and second surface conductors 13 and 14 are not necessarily required.

First inner conductors 41 and second inner conductors 42 are disposed inside the ceramic body 10. The first inner conductors 41 extend to the first side surface 21 and are electrically connected to the first external terminal electrode 1. The second inner conductors 42 extend to the second side surface 22 and are electrically connected to the second external terminal electrode 2.

As shown in FIG. 3, the first external terminal electrode 1 preferably includes a base plating film 1*a* and an upper plating film 5, for example. The base plating film 1*a* is preferably formed on the first side surface 21 by direct plating so as to cover exposed portions 41*c* of the first inner conductors 41.

The upper plating film 5 preferably includes a first upper plating film 5*a* arranged to cover the base plating film 1*a* and a second upper plating film 5*b* arranged to cover the first upper plating film 5*a*. The second external terminal electrode 2 also has the same or substantially the same film structure (not shown).

As shown in FIG. 4, each of the first inner conductors 41 includes a first effective portion 41*a* and a first extending portion 41*b* that extends to the first side surface 21 from the first effective portion 41*a*. Similarly, as shown in FIG. 4, each of the second inner conductors 42 includes a second effective portion 42*a* and a second extending portion 42*b* that extends to the second side surface 22 from the second effective portion 42*a*. Desired electrical characteristics are achieved in the region where the first effective portion 41*a* and the second effective portion 42*a* sandwich a ceramic layer 50 and face each other.

Figure 5:
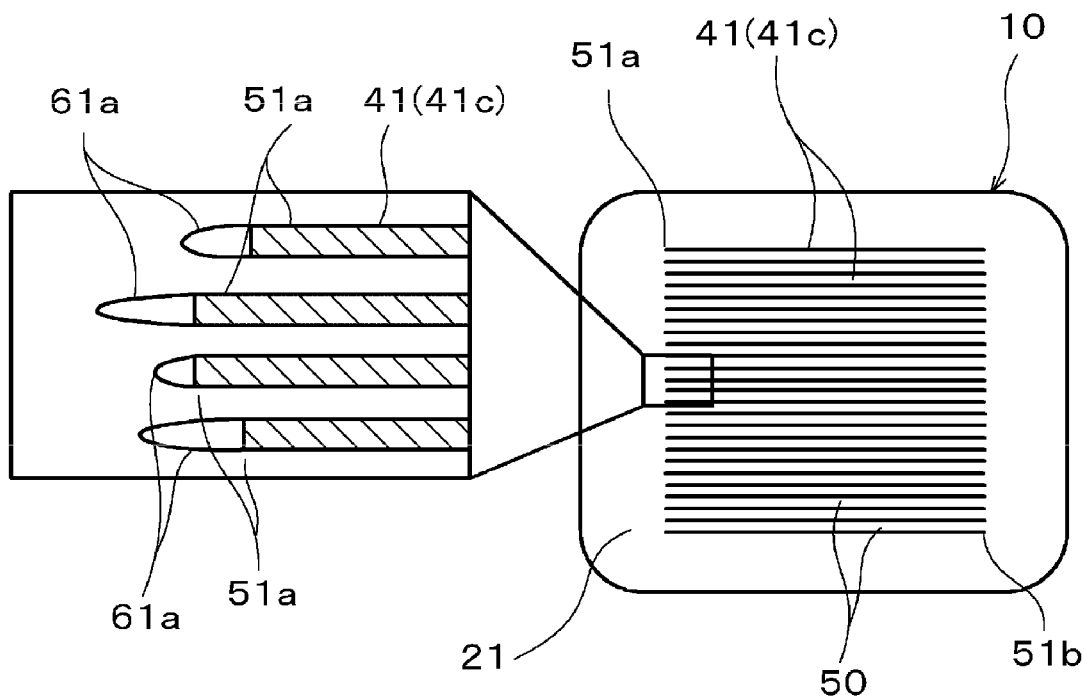
FIG. 5 is an enlarged view of one end of a first inner conductor showing a first side surface of a ceramic body before an external terminal electrode is provided in the first preferred embodiment of the present invention.
Figure 6:
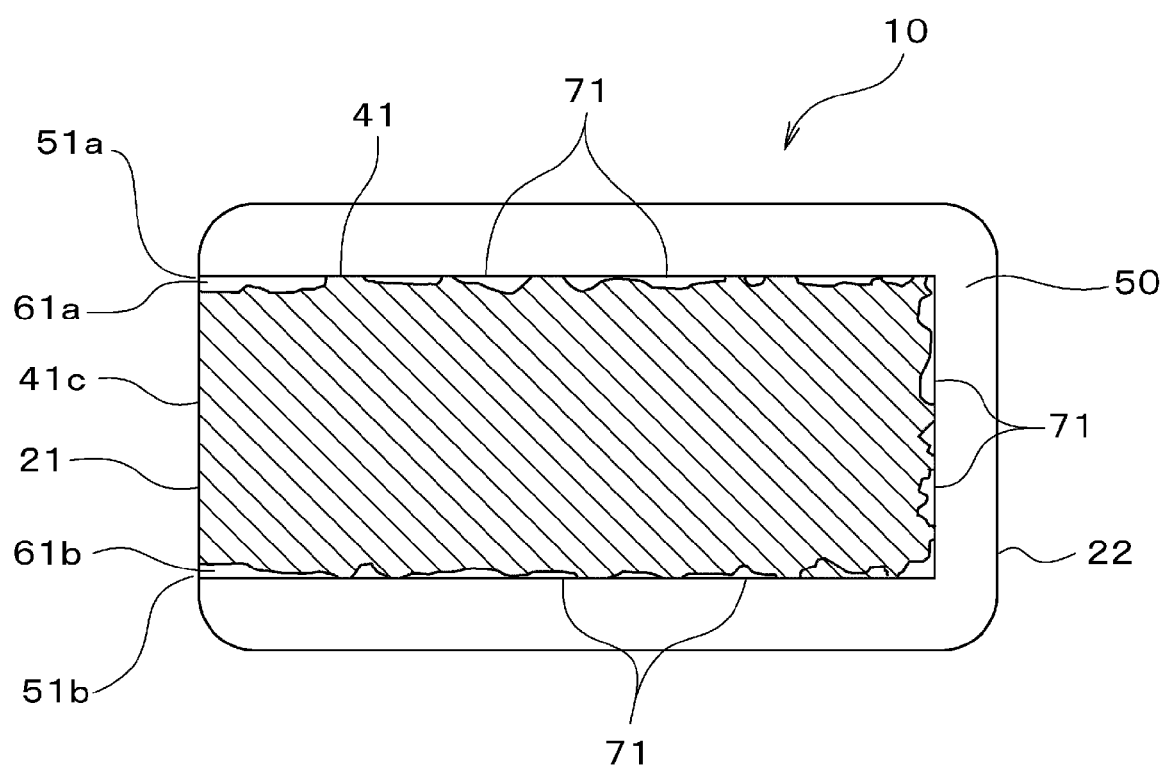
FIG. 6 is a plan view showing voids on both ends in the width direction of the first inner conductor of the ceramic body before the external terminal electrode is provided in the first preferred embodiment of the present invention.

In the multilayer ceramic electronic component of the first preferred embodiment, a void 61*a* is open to the first side surface 21 so as to be adjacent to one end 51*a* in the width direction of the exposed portion 41*c* of the first inner conductor 41 (refer to FIGS. 5 and 6). A void 61*b* is also open to the first side surface 21 so as to be adjacent to another end 51*b* in the width direction (refer to FIGS. 5 and 6). A plating metal defining the base plating film 1*a* enters the voids 61*a* and 61*b*, and is electrically connected to the first inner conductor 41 in the ceramic body 10.

Voids (inner voids) 71 are also provided at the boundary between the periphery of the inner conductor and the ceramic layer, the boundary being further toward the inside of the ceramic body 10 than the voids 61*a* and 61*b* of the exposed portion. However, the voids 71 and the voids 61*a* and 61*b* of the exposed portion are not connected, and the voids 71 themselves are discontinuous.

Accordingly, the plating metal does not enter the voids (inner voids) 71.

In the same or substantially the same manner as the first inner conductor 41, as shown in FIG. 4, a void 62*a* is open to the second side surface 22 so as to be adjacent to one end 52*a* in the width direction of the exposed portion 42*c* of the second inner conductor 42. A void 62*b* is also open to the second side surface 22 so as to be adjacent to another end 52*b* in the width direction. A plating metal defining a base plating film 2*a* enters the voids 62*a* and 62*b* on the second side surface 22, and is electrically connected to the second inner conductor 42 in the ceramic body 10.

Similarly, voids (inner voids) 72 are also provided at the boundary between the periphery of the inner conductor and the ceramic layer, the boundary being further toward the inside of the ceramic body 10 than the voids 62*a* and 62*b* of the exposed portion. However, the voids 72 and the voids 62*a* and 62*b* of the exposed portion are not connected, and the voids 72 themselves are discontinuous.

Accordingly, the plating metal does not enter the voids (inner voids) 72.

FIG. 5 is an enlarged view of the vicinity of the end 51*a* in the width direction of the exposed portion 41*c* of the first inner conductor 41 showing the first side surface 21 before the first external terminal electrode is provided. FIG. 6 schematically shows the voids 61*a* and 61*b* provided on both ends in the width direction of the exposed portion 41*c* of the first inner conductor 41 and also shows the voids (inner voids) 71 provided at the inner side.

As evident from FIG. 4, the second inner conductor 42 also has a similar structure.

In this manner, a plating metal defining the base plating film enters the voids that are adjacent to the ends in the width direction of the inner conductor, whereby an anchor effect is produced. This anchor effect improves the bonding strength and connection reliability between the inner conductor and external terminal electrode. The anchor effect in this case is better than that, for example, where voids are filled with a conductive paste. This is because such a conductive paste does not easily enter the voids due to its high viscosity, but a plating solution easily enters the voids due to its low viscosity. As a result, the plating metal is sufficiently deposited inside the voids.

In contrast, since the voids are provided in a discontinuous manner and a plating solution does not enter a ceramic body to a greater extent than necessary as described above, the reliability of products is not deteriorated.

The voids 61*a* and 61*b* and 62*a* and 62*b* of the exposed portion preferably have a width of about 1 µm to about 30 µm (the dimension in the width direction of the exposed portion of the inner conductor) and a height of about 0.5 µm to about 10 µm (the dimension in the stacking direction of ceramic layers), for example.

If the voids are too small, an insufficient anchor effect is provided. On the other hand, if the voids are too large, it becomes difficult to sufficiently fill the voids with a plating metal, which may decrease the moisture resistance of a multilayer ceramic electronic component.

In this preferred embodiment, the case in which voids are provided on both ends of an exposed portion of a single inner conductor has been shown. However, voids may preferably be provided on one end of an exposed portion of a single inner conductor. Even in this case, the bonding strength between an inner conductor and an external terminal electrode can be improved due to the anchor effect.

In accordance with manufacturing conditions, the voids are not always formed on both ends of an exposed portion of an inner conductor, and are sometimes formed on only one end of the exposed portion of the inner conductor.

When there are a plurality of inner conductors, no voids may be formed on both ends of some of the inner conductors. This is because the anchor effect described above is produced in the inner conductors in which voids are formed on both ends or on either end thereof, which improves the bonding strength between the inner conductor and the external terminal electrode.

Detail structures will be described hereinafter.

Ceramic Layer

A dielectric ceramic material including a main ingredient such as $BaTiO_3$, $CaTiO_3$, $SrTiO_3$, or $CaZrO_3$, for example, can preferably be used as the ceramic layer. Alternatively, a dielectric ceramic material in which an accessory ingredient such as a Mn compound, a Fe compound, a Cr compound, a Co compound, or a Ni compound, for example, is added to such a main ingredient may preferably be used. A piezoelectric ceramic material such as a PZT ceramic material, for example, or a semiconductor ceramic material such as a spinel ceramic material, for example, can also be used. When a dielectric ceramic material is used, the component functions as a multilayer capacitor. When a piezoelectric ceramic material is used, the component functions as a piezoelectric component. When a semiconductor ceramic material is used, the component functions as a thermistor.

The ceramic layer preferably has a thickness of about 0.1 μm to about 10 μm, for example. Where the ceramic layer is formed by firing, the thickness represents a thickness after firing.

Inner Conductor

Examples of the material of the inner conductor include Ni, Cu, Ag, Pd, Au, or an alloy thereof.

The inner conductor preferably has a thickness of about 0.1 μm to about 2.0 μm, for example. Where the inner conductor is formed by firing, the thickness represents a thickness after firing.

External Terminal Electrode

The base plating film and upper plating film are preferably composed of a plating film of a metal selected from the group consisting of, for example, Cu, Ni, Sn, Pb, Au, Ag, Pd, Bi, and Zn or a plating film of an alloy including the metals described above.

For example, when Ni is used as the inner conductor, Cu having good bondability with Ni is preferably used as the base plating film. Furthermore, Sn or Au, for example, having wettability is preferably used as the second upper plating film, and Ni, for example, functioning as a solder barrier is preferably used as the first upper plating film.

The upper plating films are optionally provided, and the external terminal electrode may preferably include a single base plating film.

Each of the plating films preferably has a thickness of about 1 μm to about 15 μm, for example.

An example of a method for manufacturing the multilayer ceramic electronic component will now be described.

Ceramic green sheets for the ceramic layers and a conductive paste for the inner conductors are prepared. Existing organic binders and organic solvents can be used as a binder and a solvent included in the ceramic green sheets and the conductive paste.

One way of forming the voids described above that can be used in this step is, for example, to decrease the amount of a plasticizer included in the conductive paste for the inner conductors.

A conductive paste is then printed on the ceramic green sheets in a desired pattern by, for example, screen printing to form an inner conductor pattern.

One way of forming the voids described above that can be used in this step is, for example, to apply a cellulosic resin around one end and another end of the exposed portions of the inner conductor pattern and then to remove the cellulosic resin when firing.

A desired number of ceramic green sheets on which the inner conductor pattern is printed are stacked. On the top and bottom of the stacked ceramic green sheets, a desired number of ceramic green sheets for external layers on which the inner conductor pattern is not printed are stacked to make a green mother multilayer body. The mother multilayer body is optionally pressure-bonded in the stacking direction by isostatic pressing or other suitable method. The sequence of stacking ceramic green sheets is not specifically limited.

One way of forming the voids described above that can be used in this step is, for example, to insert a thin film between a die and the mother multilayer body when pressure-bonding. The voids described above can be formed by controlling pressure-bonding strength. Examples of the thin film include a polypropylene (PP) film and a polyethylene terephthalate (PET) film.

The green mother multilayer body is cut into green chips having a desired size.

One way of forming the voids described above that can be adopted in this step is, for example, to provide laser processing onto one end and another end of the exposed portions of the inner conductors.

Each of the green chips is then fired. Although the firing temperature depends on the materials of the ceramic green sheets and the conductive paste for the inner conductors, it is preferably about 900° C. to about 1300° C., for example.

One way of forming the voids described above that can be adopted in this step is, for example, to significantly shrink the inner conductors by setting a long firing time in an atmosphere of low oxygen partial pressure.

More specifically, the temperature is preferably maintained at about 650° C. to about 800° C. for about 1 to 2 hours in the first half of firing before the temperature reaches its maximum. As soon as the temperature is maintained, a $H_2/N_2$ mixture gas is injected to achieve an oxygen partial pressure of about $10^{-8}$ MPa to about $10^{-12}$ MPa, whereby voids can be formed at ends in the width direction of the exposed portions of the inner conductors.

Subsequently, the edges and corners of the chip (ceramic body) are optionally rounded by, for example, barreling. A base plating film is then formed on the exposed portions of the inner conductors by plating.

Either electrolytic plating or electroless plating can preferably be used. However, in the electroless plating, pre-treatment with a catalyst is required to improve the deposition rate, which complicates this step. Thus, electrolytic plating is preferably used in most circumstances. Barrel plating is preferably used as a plating method.

Where the first and second surface conductors 13 and 14 (refer to FIG. 2) are formed, a surface conductor pattern may be printed on outermost ceramic green sheets in advance and then fired together with a ceramic body. Alternatively, a surface conductor pattern may be printed on the principal surfaces of a fired ceramic body and then fired.

One or more layers of an upper plating film are optionally formed on the base plating film. Thus, the multilayer ceramic electronic component having a structure shown in FIGS. 1 to 4 can be provided.

Second Preferred Embodiment

Figure 7:
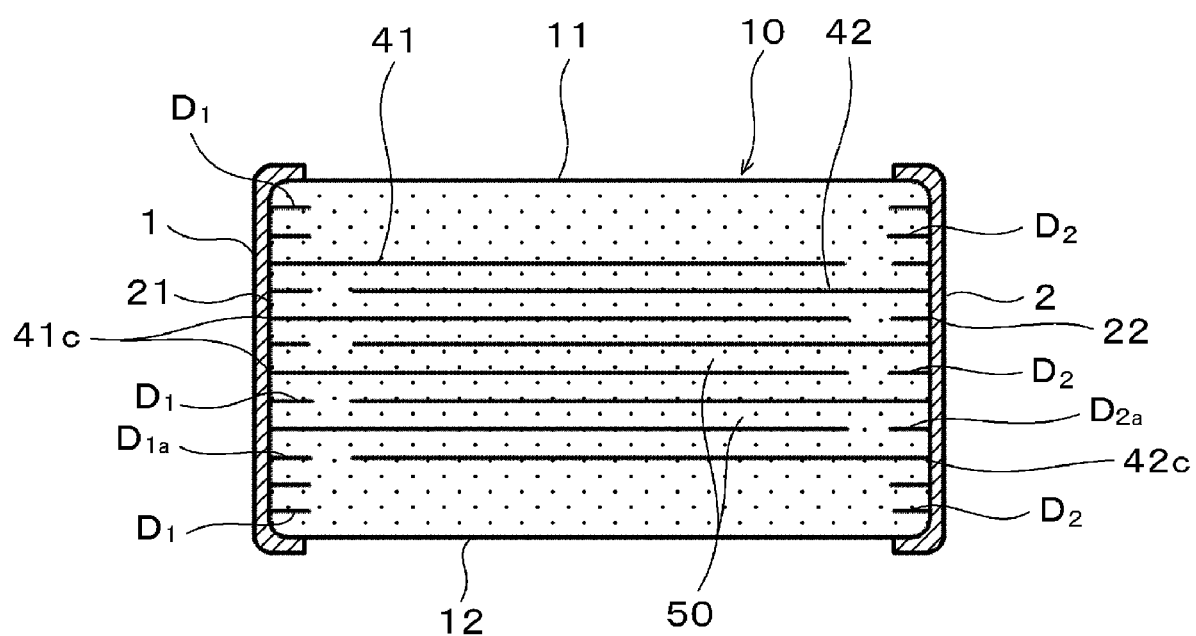
FIG. 7 is a sectional view showing a multilayer ceramic electronic component according to a second preferred embodiment of the present invention.

FIG. 7 shows a multilayer ceramic electronic component according to a second preferred embodiment of the present invention. The multilayer ceramic electronic component according to the second preferred embodiment has substantially the same structure as the multilayer ceramic electronic component according to the first preferred embodiment, except that the ceramic body 10 further includes first dummy inner conductors $D_1$ having exposed portions on the first side surface 21 and second dummy inner conductors $D_2$ having exposed portions on the second side surface 22. In FIG. 7, the portions designated by the same reference numerals as those in FIGS. 2 and 4 represent the same portions or the corresponding portions.

Both of the first and second dummy inner conductors $D_1$ and $D_2$ are electrodes that do not contribute to the electrical characteristics.

The first dummy inner conductors $D_1$ are preferably formed on the same planes as the second inner conductors 42, and are also disposed in the external portion at which the first and second inner conductors 41 and 42 are not present. In the external portion, the first and second dummy inner conductors $D_1$ and $D_2$ are preferably disposed on the same planes. In FIG. 7, the portions designated by the same reference numerals as those in FIG. 2 represent the same portions or the corresponding portions.

As shown in FIG. 7, the exposed portions 41c of the first inner conductors 41 and the exposed portions $D_{1a}$ of the first dummy inner conductors $D_1$ are preferably alternately arranged on the first side surface 21 in the stacking direction of the ceramic layers 50. Likewise, the exposed portions 42c of the second inner conductors 42 and the exposed portions $D_{2a}$ of the second dummy inner conductors $D_2$ are preferably alternately arranged on the second side surface 22 in the stacking direction of the ceramic layers 50. In the external portion, the first and second dummy inner conductors $D_1$ and $D_2$ are continuously arranged.

As described in the second preferred embodiment, by providing the dummy inner conductors, the voids can be formed on one end and another end in the width direction of the exposed portions of the dummy inner conductors. Therefore, an additional anchor effect is provided at those voids.

Furthermore, since the intervals on the side surface between the exposed portions of the inner conductors can be reduced, the growth of the base plating film can be facilitated.

The arrangement of the dummy inner conductors is not specifically limited. For example, the dummy inner conductors are not necessarily disposed in the external portion.

Third Preferred Embodiment

Figure 8:
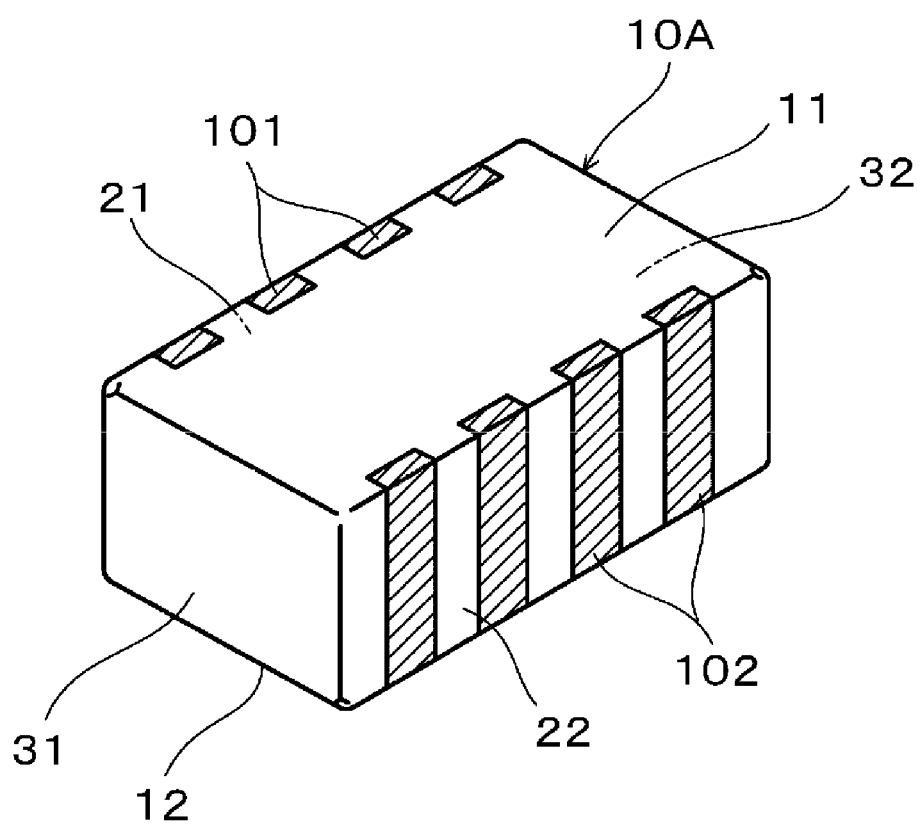
FIG. 8 is a perspective view showing an exterior of an array type multilayer ceramic electronic component (capacitor array) according to a third preferred embodiment of the present invention.
Figure 9:
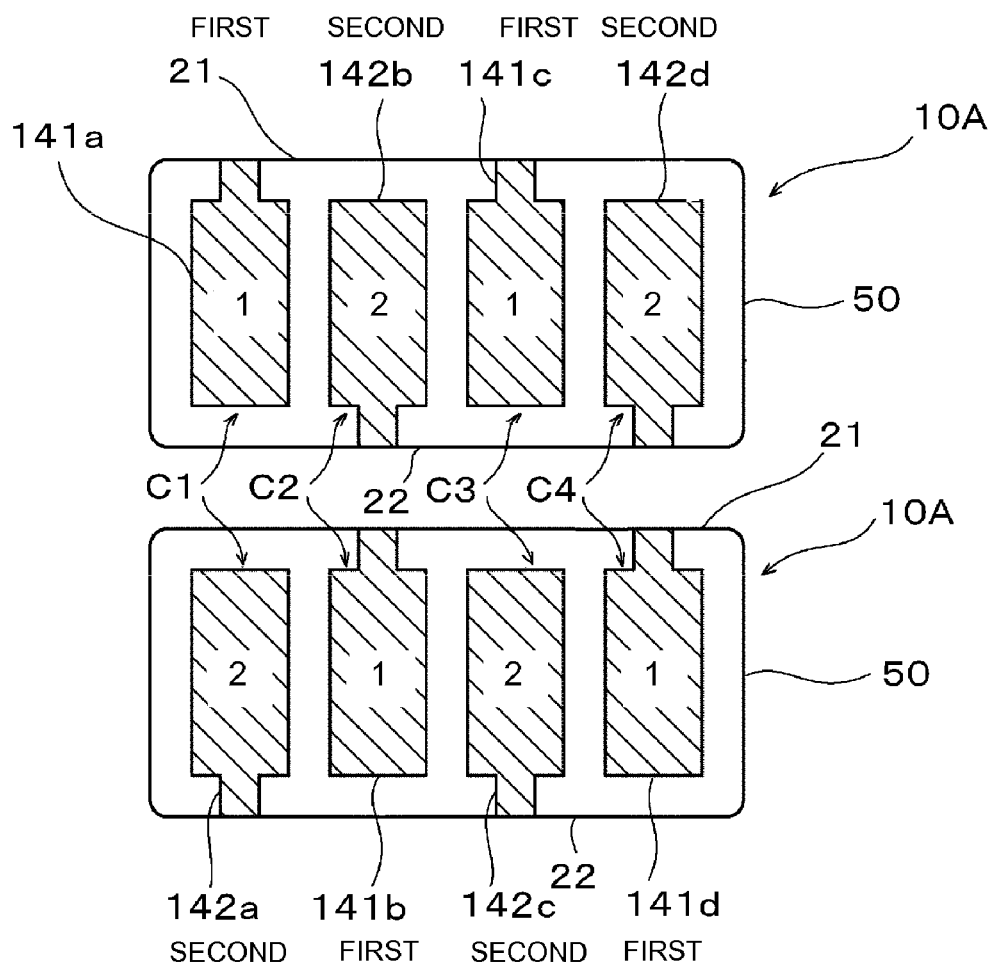
FIG. 9 shows an arrangement pattern of a plurality of inner electrodes of the array type multilayer ceramic electronic component according to the third preferred embodiment of the present invention.

FIG. 8 shows an array type multilayer ceramic electronic component (capacitor array) according to a third preferred embodiment of the present invention. FIG. 9 shows an arrangement of the inner conductors. The array type multilayer ceramic electronic component of the third preferred embodiment includes a substantially rectangular parallelepiped capacitor array body (ceramic body) 10A having first and second principal surfaces 11 and 12 opposing each other, first and second side surfaces 21 and 22 opposing each other, and third and fourth side surfaces 31 and 32 opposing each other.

A plurality of first external terminal electrodes 101 are provided on the first side surface 21 of the capacitor array body 10A. A plurality of second external terminal electrodes 102 are provided on the second side surface 22. The first external terminal electrodes 101 and the second external terminal electrodes 102 are electrically insulated.

Inside the capacitor array body 10A, as shown in FIG. 9, a plurality of first inner conductors 141a, 141b, 141c, and 141d and a plurality of second inner conductors 142a, 142b, 142c, and 142d are arranged so as to face each other through the ceramic layer (dielectric layer) 50. In other words, the first inner conductors 141a, 141b, 141c, and 141d and the second inner conductors 142a, 142b, 142c, and 142d are alternately arranged in the longitudinal direction of the capacitor array body 10A in the same plane, and are arranged so as to face each other through the ceramic layer 50 in the stacking direction. In addition, each of the first inner conductors 141a, 141b, 141c, and 141d extends to the first side surface 21 and is electrically connected to the first external terminal electrode 101. Each of the second inner conductors 142a, 142b, 142c, and 142d extends to the second side surface 22 and is electrically connected to the second external terminal electrode 102.

In the array type multilayer ceramic electronic component of the third preferred embodiment, four capacitors C1, C2, C3, and C4 formed by arranging the first inner conductors 141a, 141b, 141c, and 141d and the second inner conductors 142a, 142b, 142c, and 142d so as to face each other through the ceramic layer 50 are provided in the longitudinal direction of the capacitor array body 10A.

In such a multi-terminal multilayer ceramic electronic component of the third preferred embodiment, since the external terminal electrodes are substantially strip-shaped and the inner conductors have relatively small exposed portions, the bonding strength between the inner conductors and the external terminal electrodes tends to be insufficient as compared to the two-terminal multilayer ceramic electronic component of the first preferred embodiment. However, by applying a preferred embodiment of the present invention to such a multi-terminal multilayer ceramic electronic component, a plating metal defining the base plating film enters the voids at the ends in the width direction of the exposed portions of the inner conductors, which produces an anchor effect. The anchor effect improves the bonding strength between the inner conductors and the external terminal electrodes. This is particularly advantageous.

Fourth Preferred Embodiment

Figure 10:
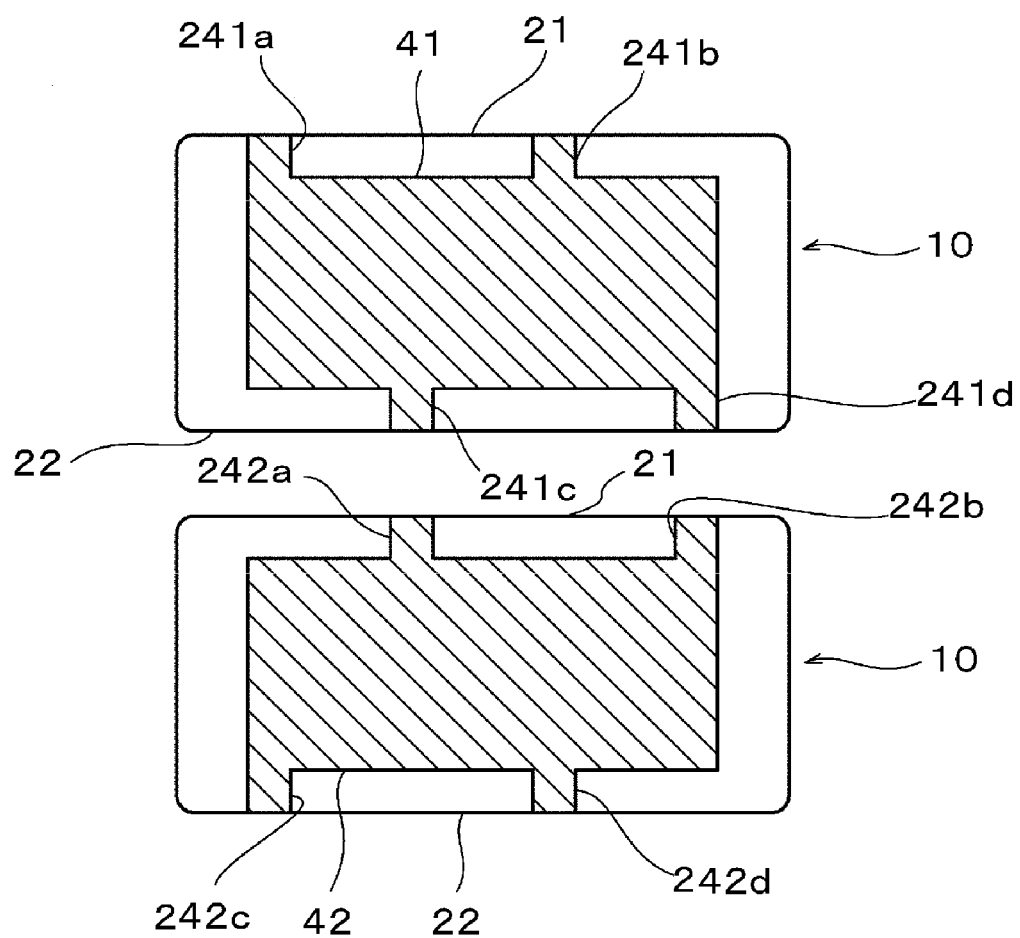
FIG. 10 shows a multi-terminal low-equivalent series inductance (ESL) multilayer ceramic electronic component according to a fourth preferred embodiment of the present invention.

FIG. 10 shows an inner conductor pattern of a multi-terminal low-ESL multilayer ceramic electronic component according to a fourth preferred embodiment of the present invention.

The multilayer ceramic electronic component of this fourth preferred embodiment includes a first inner conductor 41 having a plurality of extending portions 241a, 241b, 241c, and 241d (four extending portions in this fourth preferred embodiment) and a second inner conductor 42 having a plurality of extending portions 242a, 242b, 242c, and 242d (four extending portions in this fourth preferred embodiment).

As shown in FIG. 10, the extending portions 241a, 241b, 241c, and 241d of the first inner conductor 41 and the extending portions 242a, 242b, 242c, and 242d of the second inner conductor 42 are preferably arranged on the first and second side surfaces 21 and 22 in a staggered configuration. That is to say, they are arranged as follows when viewed in plan view:

(a) one extending portion 241b of the first inner conductor 41 is arranged between the extending portions 242a and 242b of the second inner conductor 42;

(b) another extending portion 241c of the first inner conductor 41 is arranged between the extending portions 242c and 242d of the second inner conductor 42;

(c) one extending portion 242a of the second inner conductor 42 is arranged between the extending portions 241a and 241b of the first inner conductor 41; and (d) another extending portion 242d of the second inner conductor 42 is arranged between the extending portions 241c and 241d of the first inner conductor 41.

The external terminal electrodes of this multilayer ceramic electronic component are preferably also arranged so as to cover the extending portions (exposed portions) of the first and second inner conductors that are exposed on the side surfaces of the component.

In such a multi-terminal multilayer ceramic electronic component of the fourth preferred embodiment (low-ESL multilayer ceramic capacitor), by applying a preferred embodiment of the present invention, a plating metal defining the base plating film enters the voids at the ends in the width direction of the exposed portions of the inner conductors, which produces an anchor effect. The anchor effect can provide a multilayer ceramic electronic component having high reliability and high bonding strength between the inner conductors and the external terminal electrodes.

Example 1

First, about 10% by weight of an organic binder, about 50% by weight of a mixed organic solvent of toluene and ethanol, and about 5% by weight of a plasticizer were added into ceramic raw powder. The mixture was thoroughly mixed using a media disperser to make dielectric raw slurry.

The dielectric raw slurry was then applied onto a polyester film using a gravure coater to form ceramic green sheets having a thickness of about 5 μm.

Subsequently, about 10 g of Ni powder and ethyl cellulose were dispersed and dissolved in butyl carbitol to make a Ni paste. An inner conductor pattern was printed on the ceramic green sheets with the Ni paste and the ceramic green sheets were then dried.

The plurality of dried ceramic green sheets on which the inner conductor pattern was printed were stacked. Other ceramic green sheets on which an inner conductor pattern was not printed were stacked on the top and bottom of the stacked ceramic green sheets to obtain a multilayer body.

After the multilayer body was pressure-bonded in the thickness direction thereof at about 500 MPa at about 60° C. using a die, the multilayer body was cut in a grid to obtain green multilayer chips.

Each of the green multilayer chips was inserted into a firing furnace, heated to about 650° C., and maintained at the temperature for about 2 hours to fire the organic binder. A mixed gas of $H_2$ and $N_2$ was then injected and the temperature was increased to about 1250° C. at a rate of about 300° C./hr. Subsequently, a mixed gas of $H_2$ and $N_2$ was injected and the multilayer chip was maintained for about 2 hours at a low oxygen partial pressure of about $10^{-11}$ MPa. After that, the temperature was decreased to about 700° C. at a rate of about 50° C./hr, and then cooled to the room temperature to obtain a fired body (ceramic body).

When the ends of the ceramic body in the width direction of the exposed portions of the inner conductors were observed using a scanning electron microscope (SEM) with a magnification of about 2000 times, it was confirmed that voids having a width of about 4 μm to about 16 μm and a height of about 0.6 μm to about 4 μm were formed. This is because the oxidization domain of Ni disappeared when the multilayer chip was maintained at about 650° C. while at the same time a holding force of Ni decreased at a ceramic interface and Ni shrank due to surface tension.

The edges and corners of the fired body were rounded by barreling or other suitable methods. Cu plating was then directly performed on the end surfaces of the fired body by electrolytic barrel plating to form a base plating film. Similarly, Ni plating and Sn plating were performed to form an upper plating film. Thus, a multilayer ceramic electronic component according to Example 1 of a preferred embodiment of the present invention was obtained.

The plating conditions for forming the Cu plating film (base plating film) are as follows:

| | |
|---|---|
| Plating bath composition | Pyrobright Process available from C. Uyemura & Co., Ltd. |
| pH | about 8.6 |
| Temperature | about 55° C. |
| Plating method | horizontal barrel plating |
| Barrel period | about 2.6 m/min |
| Size of steel balls | about 1.3 mm (diameter) |
| Current density × time | about 0.3 A/dm$^2$ × about 300 min |

Next, a comparative multilayer ceramic electronic component was manufactured.

The comparative multilayer ceramic electronic component was manufactured in substantially the same manner as the multilayer ceramic electronic component of Example 1, until the step in which green multilayer chips are obtained.

In the Comparative Example, in the firing step, each of the green multilayer chips was inserted into a firing furnace, heated to about 850° C., and maintained at the temperature for about 4 hours to fire the organic binder. The temperature was increased to about 1250° C. at a rate of about 300° C./hr. Subsequently, a mixed gas of $H_2$ and $N_2$ was injected and the multilayer chip was maintained for about 2 hours at a low oxygen partial pressure of about $10^{-11}$ MPa. The temperature was decreased to about 700° C. at a rate of about 50° C./hr, and then cooled to the room temperature to obtain a fired body (comparative ceramic body).

The edges and corners of the fired body were rounded by barreling or other methods in the same manner as in Example 1. Cu plating was then directly performed on the end surfaces of the fired body by electrolytic barrel plating to form a base plating film. Similarly, Ni plating and Sn plating were performed to form an upper plating film. Thus, a comparative multilayer ceramic electronic component was obtained.

The bonding strength of an external terminal electrode to the ceramic body was measured for the sample of Example 1 and the sample of Comparative Example manufactured as described above. It was confirmed that the sample of Comparative Example had a bonding strength of about 31.5 N whereas the sample of Example 1 had an improved bonding strength of about 42.7 N. To measure the bonding strength, after each of the samples was soldered on a glass-epoxy substrate, a load of about 0.5 mm/sec was applied from the side surface of the samples in the direction parallel or substantially parallel to the end surface of the sample using a shear tester. The load when the Cu plating film was peeled off from the fired body was defined as the bonding strength.

Example 2

In the step of manufacturing a dielectric raw slurry in Example 1, the amount of the plasticizer was changed from about 5% by weight to about 2% by weight.

Green multilayer chips were made using the dielectric raw slurry, and then fired under the same conditions as in Example 1 described above to make a fired body (ceramic body).

When the ends of the fired body in the width direction of the exposed portions of the inner conductors were observed using a SEM with a magnification of about 2000 times, it was confirmed that voids having a width of about 9 μm to about 33 μm and a height of about 0.8 μm to about 10 μm were formed.

Subsequently, a multilayer ceramic electronic component according to Example 2 of a preferred embodiment of the present invention was manufactured in the same manner as Example 1.

The bonding strength of an external terminal electrode to the ceramic body was measured for the sample of Example 2 and the sample of Comparative Example manufactured in Example 1. It was confirmed that the sample of Comparative Example had a bonding strength of about 31.5 N, whereas the sample of Example 2 had an improved bonding strength of about 63.2 N. The same method for measuring bonding strength as in the case of Example 1 was used.

Example 3

In the step of pressure-bonding a multilayer body in Example 1, after a thin film was inserted between a die and the multilayer body, the multilayer body was pressure-bonded in the thickness direction thereof at about 500 MPa at about 60° C. to make green multilayer chips. A polyethylene terephthalate (PET) film having a thickness of about 50 μm was used as the thin film.

Each of the green multilayer chips was fired under the same conditions as Example 1 to make a fired body (ceramic body). When the ends of the fired body in the width direction of the exposed portions of the inner conductors were observed using a SEM with a magnification of about 2000 times, it was confirmed that voids having a width of about 6 μm to about 26 μm and a height of about 1 μm to about 6 μm were formed.

Subsequently, a multilayer ceramic electronic component according to Example 3 of the present invention was manufactured in the same manner as in the case of Example 1.

The bonding strength of an external terminal electrode to the ceramic body was measured for the sample of Example 3 and the sample of Comparative Example manufactured in Example 1. It was confirmed that the sample of Comparative Example had a bonding strength of about 31.5 N whereas the sample of Example 3 had an improved bonding strength of about 49.3 N. The same method for measuring bonding strength as in the case of Example 1 was used.

The present invention is not limited to the preferred embodiments and Examples described above. Regarding the materials of the inner conductors and external terminal electrodes, the shape of the connecting portion that connects the exposed portions of the inner conductors, the method for forming the connecting portion, the method for forming the voids, and the method for forming the external terminal electrodes, for example, various applications and modifications can be made within the scope of the present invention.

In preferred embodiments of the present invention, as described above, a high-performance small multilayer ceramic electronic component with high reliability having thin external terminal electrodes that are formed by direct plating and that have excellent bonding strength to a ceramic body can be efficiently manufactured.

Accordingly, preferred embodiments of the present invention are widely applicable to various multilayer ceramic electronic components having a structure in which inner conductors are disposed in a ceramic body and external terminal electrodes are disposed on the surface of the ceramic body by direct plating so as to be electrically connected to the inner conductors. Examples of the various multilayer ceramic electronic components include multilayer ceramic capacitors, multilayer chip inductors, and multilayer chip thermistors.

While preferred embodiments of the invention have been described above, it is to be understood that variations and modifications will be apparent to those skilled in the art without departing from the scope and spirit of the invention. The scope of the invention, therefore, is to be determined solely by the following claims.

What is claimed is:

1. A multilayer ceramic electronic component comprising:
a ceramic body including a first principal surface and a second principal surface opposing each other, a first side surface and a second side surface opposing each other and connecting the first principal surface to the second principal surface and a third side surface and a fourth side surface opposing each other and connecting the first principal surface to the second principal surface and the ceramic body including a plurality of stacked ceramic layers;
an inner conductor provided in the ceramic body, the inner conductor including an exposed portion having a width on at least the first side surface; and
an external terminal electrode provided on at least the first side surface, the external terminal electrode being electrically connected to the inner conductor; wherein
the external terminal electrode includes a base plating film that is directly plated on at least the first side surface so as to directly contact and cover the exposed portion of the inner conductor;
voids are provided in a discontinuous manner at a periphery of the inner conductor at which the inner conductor contacts a respective one of the plurality of stacked ceramic layers;
at least one of the voids is open to at least the first side surface of the ceramic body;
the at least one of the voids is arranged adjacent to the exposed portion of the inner conductor in a direction connecting the third side surface to the fourth side surface; and
a plating metal defining the base plating film is disposed in the at least one of the voids that is open to at least the first side surface of the ceramic body, is not disposed in any of the voids other than the at least one of the voids that is open to at least the first side surface of the ceramic body, and is electrically connected to the inner conductor in the ceramic body.

2. A method for manufacturing a multilayer ceramic electronic component including a ceramic body including a first principal surface and a second principal surface opposing each other, a first side surface and a second side surface opposing each other and connecting the first principal surface to the second principal surface and a third side surface and a fourth side surface opposing each other and connecting the first principal surface to the second principal surface and formed by stacking a plurality of ceramic layers, a plurality of inner conductors that are formed in the ceramic body, portions of the plurality of inner conductors being exposed on at least the first side surface of the ceramic body, which are exposed portions, and an external terminal electrode formed on at least the first side surface of the ceramic body so as to be electrically connected to the plurality of inner conductors and to cover the exposed portions of the plurality of inner conductors, comprising the steps of:
forming the ceramic body including the plurality of inner conductors arranged so as to face each other through respective ones of the plurality of ceramic layers and including voids formed in a discontinuous manner at peripheries of the plurality of inner conductors at which the plurality of inner conductors contact the respective ones of the plurality of ceramic layers, at least one of the voids being open to at least the first side surface of the ceramic body, the at least one of the voids being arranged adjacent to the exposed portion of at least one of the plurality of inner conductors in a direction connecting the third side surface to the fourth side surface; and forming a base plating film on at least the first side surface of the ceramic body by direct plating in a step of forming the external terminal electrode on the ceramic body, such that the base plating film directly contacts and covers the exposed portions of the plurality of inner conductors and a plating metal defining the base plating film enters the at least one of the voids that is open to at least the first side surface of the ceramic body, does not enter any of the voids other than the at least one of the voids that is open to at least the first side surface of the ceramic body, and is electrically connected to the plurality of inner conductors in the ceramic body.

3. The method for manufacturing a multilayer ceramic electronic component according to claim 2, wherein, in the step of forming the ceramic body, the voids are formed when a green ceramic body is fired.

* * * * *